United States Patent

Kessler et al.

[11] Patent Number: 5,959,817
[45] Date of Patent: Sep. 28, 1999

[54] CONTROL DEVICE FOR OPERATING A WIPER MOTOR

[75] Inventors: Martin Kessler, Bühl; Peter Buerk, Lichtenau-Grauelsbaum, both of Germany

[73] Assignee: Robert Bosch, Stuttgart, Germany

[21] Appl. No.: 08/974,979

[22] Filed: Nov. 20, 1997

[30] Foreign Application Priority Data

Feb. 17, 1997 [DE] Germany ............................ 197 05 925

[51] Int. Cl.⁶ ...................................................... H02H 7/00
[52] U.S. Cl. ................................ 361/33; 361/25; 361/115; 361/93
[58] Field of Search ................................. 361/18, 56, 93, 361/96, 100, 23, 24, 25, 115, 103, 33

[56] References Cited

U.S. PATENT DOCUMENTS 4,717,985  1/1988  Demeyer ..................................... 361/96
5,666,066  9/1997  Jo .............................................. 324/772

FOREIGN PATENT DOCUMENTS 28 47 765 A1   5/1980   Germany ......................... H02H 7/085
19544505 A1    5/1996   Germany ........................ G01R 19/165

*Primary Examiner*—Jeffrey Gaffin
*Assistant Examiner*—Stephen W. Jackson
*Attorney, Agent, or Firm*—Venable; Norman Kunitz

[57] ABSTRACT

A control device for operating a wiper motor (10) which utilizes the typical path of the wiper motor current (Im) with cyclically recurring minima during the detection of an overload of the wiper motor (10) caused by blockage or tightness of the wiper. During this process, a storage element (C) that integrates the motor current (Im) is short-circuited at least twice within a wiping cycle (Tw) during normal operation so that the transfer of the admissible overload from a half of a wiping cycle (Tw/2) to the following half of the wiping cycle (Tw/2) is prevented and the limit value (G) for the shut-down of the wiper motor (10) is not reached through accumulation of the admissible overload.

7 Claims, 3 Drawing Sheets

CONTROL DEVICE FOR OPERATING A WIPER MOTOR

REFERENCE TO RELATED APPLICATIONS

This application claims the priority of German patent application Serial No. 197 05 925.2, filed Feb. 17, 1997, which is incorporated herein by reference.

BACKGROUND OF THE INVENTION

The invention relates to a control device for operating a wiper motor (10), in particular, for a motor vehicle.

According to German published patent application DE OS 28 47 765, a circuit arrangement to protect a drive motor from overload has already been disclosed, wherein the measuring circuit comprises a memory circuit having a storage element that can be charged with each detection of a motor overload current and that can be discharged again during the time period between successive detections of respectively separately occurring motor overload currents. Furthermore, an evaluating device is also connected to the storage element with the evaluating device only emitting an output signal that shuts down the motor when the voltage at the cited storage element exceeds a predetermined trigger threshold.

Short-time motor overloads only result in a shutdown of the motor when these overloads correspond to a dangerous overload of the motor over the respectively considered time period. This means that short-time overloads of the motor must be stored over a time period so as to interrupt the motor circuit when a predetermined threshold value is reached.

During this process, the voltage, which is measured at a shunt resistor and which corresponds to the motor current, is supplied to a comparator, which emits an output voltage on the output side corresponding to the difference between the two voltages supplied on the input side when the threshold voltage is exceeded. A storage capacitor is charged with this output voltage. The charging time constant of the storage capacitor is selected to be considerably smaller than the discharging time constant. In this manner, corresponding charges are accumulated on the storage capacitor. If the voltage that is present at the capacitor exceeds a further threshold value, the electric circuit of the motor is interrupted.

The drawback of this circuit arrangement is that the short-time overloads that follow one another are accumulated. This results in a so-called build-up effect which is realized by the selection of the ratio of charge time constant and discharge time constant of the storage capacitor.

A further drawback is that the storage element only responds when a motor overload current is detected, i.e., the threshold is not exceeded until an overload occurs.

In particular, this circuit arrangement cannot be used for a wiper system having a current path which characterizes the wiping motion of wipers because the current path is subject to great variations and the admissible overload would be accumulated in an undesirable manner.

SUMMARY AND ADVANTAGES OF THE INVENTION

According to the preferred embodiment of the invention, a control device for operating a wiper motor, in particular, for a motor vehicle, comprises: circuit means connected to the wiper motor for providing a measuring voltage (Um) that is a measure for the current (Im) flowing through the motor; a monitoring arrangement for detecting to detect an elevated load condition of the motor, with the monitoring arrangement comprising: a comparator for comparing the measuring voltage (Um) with a first threshold value (S1) to provide an output signal when the first threshold value is exceeded; a storage element; circuit means for charging the storage element with a charging current (Ic) proportional to the motor current (Im) each time the first threshold value (S1) is exceeded; means for comparing a voltage (Uc), built up across the storage element by the charging current (Ic), with a predetermined limit value (G), and for switching off the motor when the limit value (G) is reached: and means for resetting the storage element by short-circuiting same each time the measuring voltage (Um) falls short of the first threshold value (S1).

In a wiper system, load moment minima, and thus also current minima, appear in the reversing positions of the wiper that is driven by a wiper motor. The control device according to the invention described above offers the advantage of utilizing the typical wiper motor current path with these cyclically recurring minima during the detection of an overload of the wiper motor by blocking of the wiper or by making the wiper difficult to move or operate. During this process, a storage element that integrates the motor current is short-circuited at least twice within a wiping cycle in the normal operation so that the transfer of the admissible overload from a half of a wiping cycle to the following half of the wiping cycle is prevented and the limit value for the shut-down of the wiper motor is not reached through accumulation of the admissible overload.

Since the course, as a function of time, of the wiper motor is subject to great variations within a wiping cycle, a quasi-effective value is formed through this integration of the motor current; the level and the duration of the motor current become part of this quasi-effective value. As the overload increases, the motor current also rises. But then the motor decelerates and it takes longer until the wiper reaches its reversing position again. This means that integration takes place over a longer time period.

Furthermore, it is advantageous that the storage element is charged with a charging current which is proportional to the motor current and therefore corresponds to the integral of the motor current.

BRIEF DESCRIPTION OF THE DRAWINGS

An embodiment of the invention is illustrated in the drawings and explained in greater detail in the description below. In the drawing figures.

DETAILED DESCRIPTION OF THE PREFERRED EMBODIMENT

Figure 1:
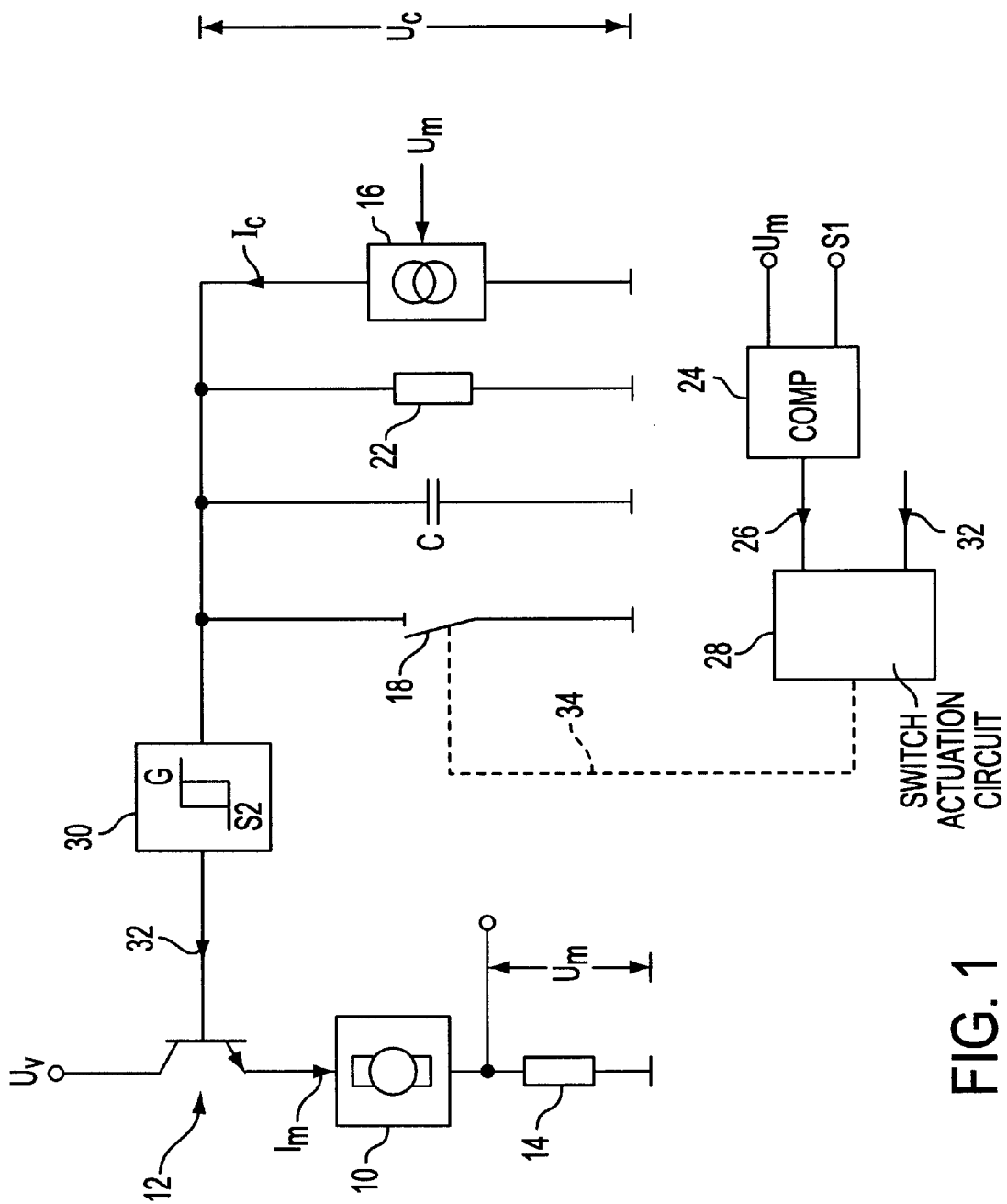
FIG. 1 is a schematic circuit diagram of a control device according to the invention, shown in a simplified manner.

FIG. 1 schematically shows the cooperation of the different components of the circuit arrangement in the control device. A wiper motor 10 is connected as a switch via a transistor 12, acting as a switch, to a supply voltage Uv of the on-board motor vehicle network. Arranged in the motor circuit is a shunt resistor 14 at which a measuring voltage Um is tapped which is proportional to the motor current Im.

A voltage-controlled current source 16, for example, an operational amplifier, is actuated with the measuring voltage Um. A charging current Ic flows from the source as a function of the measuring voltage Um, i.e., proportional to the measuring voltage. This charging current Ic charges a capacitor C as a storage element to a capacitor voltage Uc when a further switch 18 connected in parallel with the capacitor C is open.

Furthermore, the measuring voltage Um is applied to an input of a first comparator 24, for example, a difference circuit, at whose second input a constant voltage S1 is applied which predetermines a first threshold value. The output signal 26 of the first comparator 24 is supplied to a switch actuation circuit 28 for controlling the further switch 18.

The transistor 12 is switched through by the output of a second comparator 30 at whose input the capacitor voltage Uc from the capacitor C is applied. A Schmitt trigger is used as the second comparator 30. The switch-on and switch-off levels of the second comparator 30 define a second threshold S2 and a limit value G, respectively. The output signal of the second comparator 30 is a switching signal 32 which switches the transistor 12.

The switching signal 32 output by the second comparator 30 is also supplied to the switch actuation circuit 28 which switches the switch 18 as a function of the output signal 26 of the first comparator 24 and of the switching signal 32 of the second comparator 30 by way of a second switching signal 34.

Figure 2:
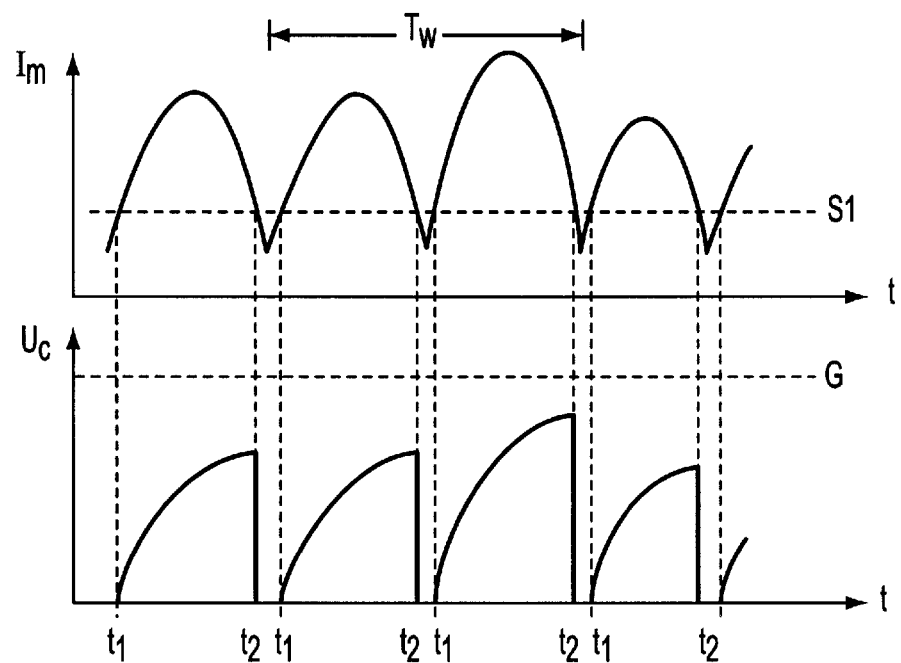
FIG. 2 shows the signal sequences of the wiper motor current and of the voltage that is applied at the storage element of FIG. 1 during normal operation.

FIG. 2, in its upper diagram, illustrates the signal sequence of the wiper motor current Im over the time t during normal operation without overload. During this process, two current maxima occur in each wiping cycle Tw. The second signal sequence in the lower diagram characterizes the capacitor voltage Uc which is plotted so as to be isochronous with the current path Im. The first threshold S1 for the comparator 24 and the limit value G for the comparator 30 are shown in dashed lines in FIG. 2.

Figure 3:
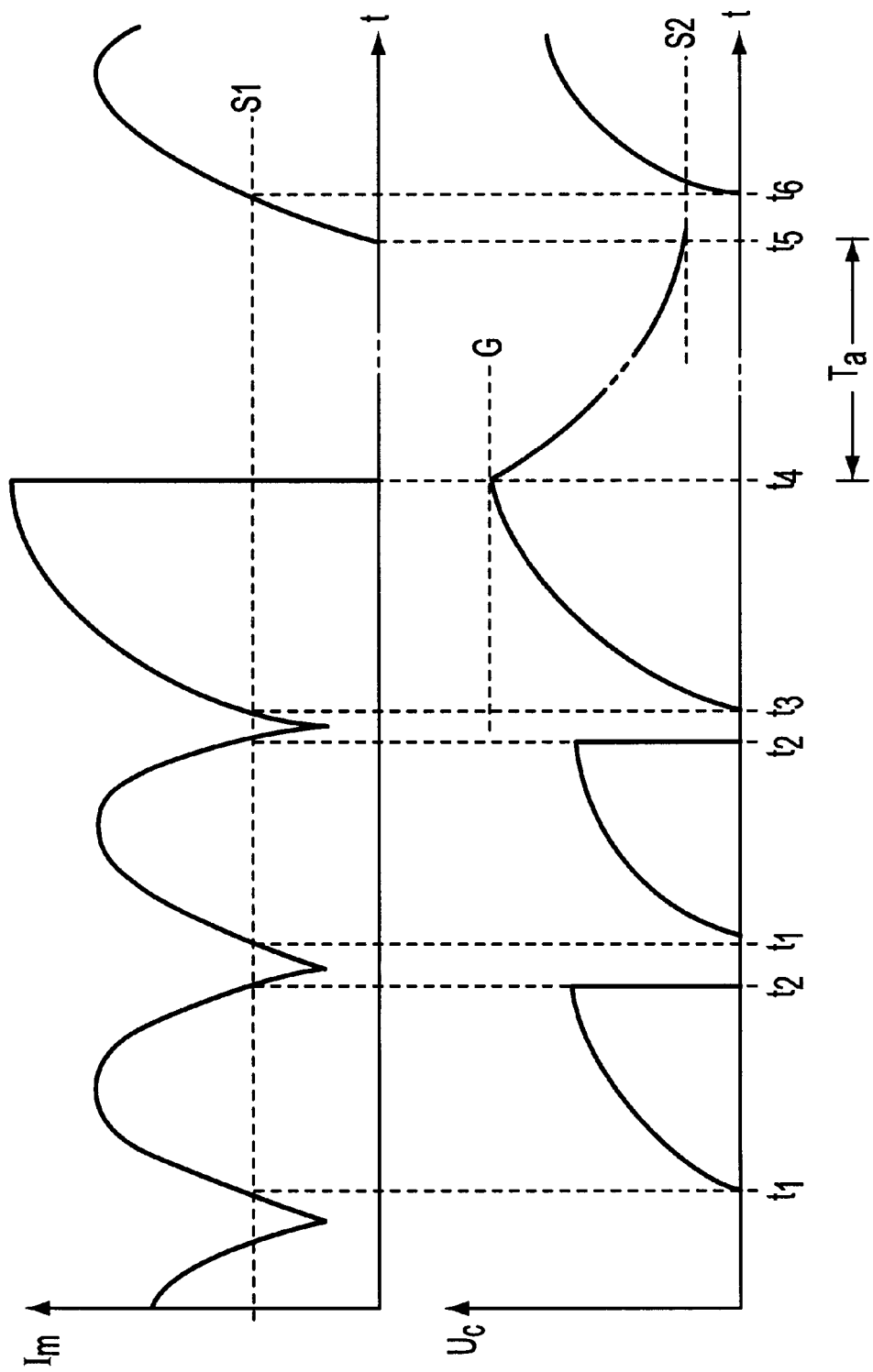
FIG. 3 shows the signal sequences and the response of the overload protection of the embodiment of the invention illustrated in FIG. 1 when the wipers are blocked; and, FIG. 4 shows the signal sequence of the motor current of the embodiment of the invention illustrated in FIG. 1 when the wiper operation is difficult.

In FIG. 3 are plotted the wiper motor current Im and the capacitor voltage Uc over the time t and the response of the overload protection when the wiper is blocked. The blocking is characterized by the increase of the motor current Im.

Figure 4:
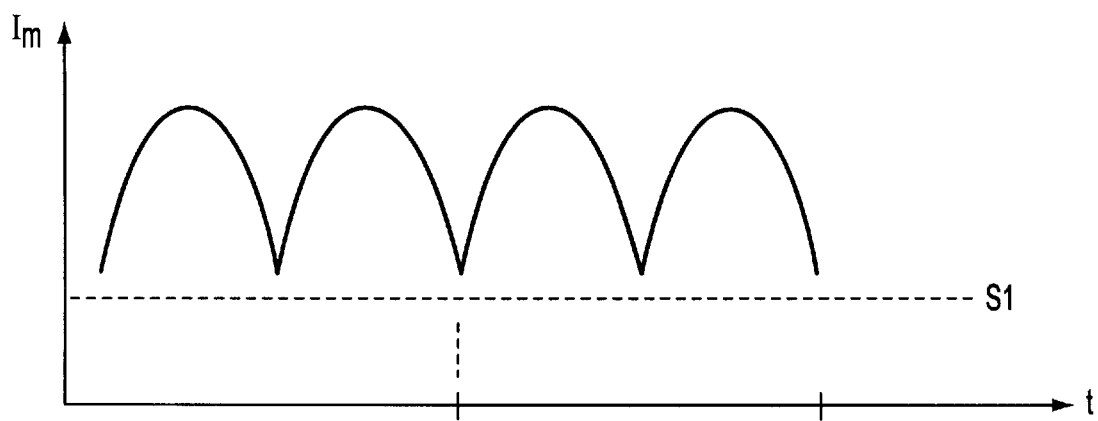

FIG. 4 shows the motor current path Im when the wiper is difficult to move or operate, e.g., due to a dry windshield. The increase of the minima and maxima of the wiper motor current Im is characterizing for the difficult movement, that is, a shift of the current path to higher values.

The control device for operating a wiper motor 10 according to FIG. 1 works as follows.

An arbitrary wiper system, which is installed in a motor vehicle and known per se and which has at least one wiper, cleans a front or rear window of a motor vehicle by swinging back and forth between two reversing positions. The associated motor current path Im can be seen from FIG. 2. The motor current path Im has cyclically recurring minima which are associated with the reversing positions of the wiper. Different maximum currents are reached between the reversing positions in the region of the wiping field because the maximum values are a function of the wiping speed of the wipers, the driving speed of the car and of the degree of moisture on the pane.

FIG. 2 shows, by way of example, how the degree of moisture on the pane is reduced temporarily when a car passes under an overpass and how the current maximum in this wiping cycle Tw is therefore increased.

The first threshold S1 of the first comparator 24 is predetermined such that it is disposed in the lower range of the motor current according to FIG. 2. If a motor current Im or a measuring voltage Um is measured that is smaller than the first threshold S1, a second switching signal 34 is supplied to the switch 18 via the switch actuation circuit 28 for closing the switch. This results in a closed circuit formed by the current source 16 and the switch 18 and this circuit prevents the capacitor C from being charged. The voltage Uc at the capacitor C remains at zero.

When the wiper leaves a reversing position, the motor current Im rises and exceeds the first threshold S1 at the moment t1. The output signal 26 of the first comparator 24 shifts or changes so that, as a consequence, switch 18 is opened by the switch actuation 28. The charging current Ic of the current source 16, which is proportional to the motor current Im, charges the capacitor C and therefore generates a capacitor voltage Uc which corresponds to the integral of the motor current. The capacitor voltage Uc is applied at the input of the second comparator 30.

When the wiper approaches the subsequent reversing position, the motor current Im drops until it has reached the first threshold S1 again at the moment t2. The first comparator 24 then supplies an output signal 26 to the switch actuation 28 which then closes the switch 18 and thus short-circuits the capacitor C. The voltage across the capacitor Uc is reset to zero.

If the motor current Im rises again as a result of a further wiping process that has been initiated, the above-described switching processes taking place at the moment t1 and t2 are repeated.

If the wipers are blocked due to snow or ice, the motor current Im increases so greatly as of the moment t3 according to FIG. 3 that the capacitor voltage Uc reaches the limit value G at the moment t4. The limit value is defined, for example, in that a motor current Im of 50 Ampere is applied for a maximum of 0.6 seconds. This reliably prevents the motor 10 and the control device from overheating.

When the switch-off level defined as limit value G is reached, the second comparator 30 opens the transistor 12 i.e., renders it non-conductive, via switching signal 32 to interrupt the motor circuit and to shut down the motor 10. The switching signal 32 is also supplied to the switch actuation circuit 28. The latter now keeps switch 18 in the open position because otherwise the switch 18 would be closed immediately if a motor current Im or a measuring voltage Um were zero.

The capacitor voltage Uc therefore discharges as of the moment t4 via the parallelly connected resistor 22. At the moment t5, the capacitor voltage Uc reaches the second threshold S2 in the second comparator 30 (switch-on level of the Schmitt trigger) so that the first switch 12 is closed again, the motor 10 is again supplied with current, and a further wiping process is initiated as long as the driver has not switched off the wiping operation in the meantime. Simultaneously, switch 18 is also closed, the capacitor C is short-circuited via this switch 18 and the capacitor voltage Uc is reset.

A time Ta=t5−t4 is set by way of a suitable dimensioning of the discharge resistor 22 of the capacitor C and of the switch-on level of the second comparator 30, during this time the motor 10 is switched off. The time Ta is tuned to the existing wiper system and depends on the motor characteristics. For example, a time Ta of 25 seconds is set.

At the moment t6, the motor current Im and thus the measuring voltage Um reaches the first threshold S1 so that thereafter the capacitor C is charged by the charging current Ic of the current source 16, as is explained above.

Once the cause for the blockage of the wiper has been removed, the further sequence then corresponds to the normal operation shown in FIG. 2. In case of a continued non-removable blockage of the wiper, the above-described overload protection repeats itself until the driver of the vehicle switches off the on-board network via the ignition switch. The limit value G and the second threshold S2, however, are tuned to one another such that damage to the wiper system can be prevented reliably if the blockage cannot be removed and if the control device continues to be switched on.

In case of difficult operation of the wiper according to FIG. 4, for example, caused by a dry pane, the current minima, but also the current maxima, essentially shift to higher currents so that the quasi-effective value becomes impermissibly high. Starting with a certain degree of difficulty, there is therefore no longer a shortfall of the first threshold S1 and the capacitor C is no longer reset. The charging current Ic charges the capacitor C until the capacitor voltage Uc reaches the limit value G and the overload protection responds. The further process can be taken from the description of FIG. 3, moment t4 to t6.

The position of the thresholds S1, S2 and of the limit value G relative to one another is decisive for the optimum effect of the overload and blocking protection.

The first threshold S1 is limited to be at low values by the demand that, during normal wiper operation, the integrated value of the motor current Im or the capacitor voltage Uc within a half of a wiping cycle Tw/2 be reset. The first threshold S1 must not be so high that the impermissible difficulty of the wiper system would no longer be detected because the raised current minima continue to be below the first threshold S1 and the integrator C would continue to be reset within a half of a wiping cycle Tw/2.

The position of the limit value G must be selected as a function of the first threshold S1 and of the performance data of the wiper motor 10.

The second threshold S2 is tuned to the limit value G such that damage to the motor 10 and the control device can be reliably prevented if the blocking or difficult operation cannot be removed and if the wiper system continues to operate.

The invention now being fully described, it will be apparent to one of ordinary skill in the art that any changes and modifications can be made thereto without department from the spirit or scope of the invention as set forth herein.

What is claimed:

1. A control device for operating a wiper motor, in particular, for a motor vehicle, including:
   circuit means connected to the wiper motor for providing a measuring voltage (Um) that is a measure for the current (Im) flowing through the motor; and,
   a monitoring arrangement for detecting an elevated load condition of the motor, with said monitoring arrangement comprising:
   a comparator for comparing the measuring voltage (Um) with a first threshold value (S1) to provide an output signal when the first threshold value (S1) is exceeded;
   a storage element;
   circuit means for charging the storage element with a charging current (Ic) proportional to the motor current (Im) each time the first threshold value (S1) is exceeded;
   means for comparing a voltage (Uc) built up across the storage element by the charging current (Ic) with a predetermined limit value (G), and for switching off the motor when the limit value (G) is reached: and,
   means for resetting the storage element by short-circuiting same each time the measuring voltage (Um) falls short of the first threshold value (S1).

2. A control device according to claim 1, wherein: the storage element is a capacitor; and the circuit means for charging included in the monitoring arrangement includes a voltage-controlled current source for generating a charging current (Ic) which is proportional to the motor current (Im) and for apply the charging current to the storage capacitor.

3. A control device according to claim 1, wherein the storage element is a capacitor and the limit value is greater than the first threshold value.

4. A control device according to claim 1, wherein: the storage element is discharged via a resistor when the limit value (G) is reached; and, the monitoring arrangement includes means for comparing a second threshold value (S2), which is less than the limit value, with the voltage (Uc) across the storage element and for causing the means for resetting to reset the storage element by short-circuiting the storage element when the when the voltage across the storage element is below the second threshold value (S2) and the motor must be switched on again.

5. A control device according to claim 4, wherein: the storage element is a capacitor; and the circuit means for charging included in the monitoring arrangement includes a voltage-controlled current source for generating a charging current (Ic) which is proportional to the motor current (Im) and for apply the charging current to the storage capacitor.

6. A control device for operating a wiper motor for a motor vehicle and for detecting an elevated load condition, said device comprising:
   circuit means connected to the wiper motor for providing a measuring voltage (Um) that is a measure for the current (Im) flowing through the motor;
   a comparator for comparing the measuring voltage (Um) with a first threshold value (S1) to provide an output signal when the first threshold value (S1) is exceeded;
   a storage capacitor;
   circuit means for charging the storage capacitor with a charging current (Ic) proportional to the motor current (Im) whenever the first threshold value (S1) is exceeded;
   means for comparing a voltage (Uc) built up across the storage capacitor by the charging current (Ic) with a predetermined limit voltage value (G), which is greater than the first threshold value (S1), and for switching off the current to the motor when the limit value (G) is reached: and,
   means, responsive to the output signal from the comparator, for discharging the storage capacitor by short-circuiting same each time the measuring voltage (Um) falls below the first threshold value (S1).

7. A control device according to claim 6, wherein:
   the storage capacitor is discharged via a parallelly connected resistor when the limit value (G) is reached; and, further comprising means for comparing a second threshold value (S2), which is less than the limit value (G), with the voltage (Uc) across the storage capacitor and for causing the means for resetting to reset the storage capacitor by short-circuiting the storage capacitor when the voltage (Uc) across the storage element is below the second threshold value (S2) and the motor current has been switched off by the means for comparing a voltage (Uc).

* * * * *